US010382935B2

(12) United States Patent
Lin et al.

(10) Patent No.: US 10,382,935 B2
(45) Date of Patent: Aug. 13, 2019

(54) EMERGENCY NOTIFICATION DEVICE

(71) Applicant: MAZDA MOTOR CORPORATION, Hiroshima (JP)

(72) Inventors: Pingyu Lin, Hiroshima (JP); Takayuki Seto, Hiroshima (JP); Hiroaki Tanimoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/085,610

(22) PCT Filed: Mar. 29, 2017

(86) PCT No.: PCT/JP2017/012895
§ 371 (c)(1),
(2) Date: Sep. 17, 2018

(87) PCT Pub. No.: WO2017/212750
PCT Pub. Date: Dec. 14, 2017

(65) Prior Publication Data
US 2019/0075444 A1    Mar. 7, 2019

(30) Foreign Application Priority Data

Jun. 7, 2016  (JP) ................ 2016-113228

(51) Int. Cl.
*H04W 4/90* (2018.01)
*H04W 4/44* (2018.01)
*B60Q 9/00* (2006.01)

(52) U.S. Cl.
CPC ............. *H04W 4/90* (2018.02); *B60Q 9/00* (2013.01); *H04W 4/44* (2018.02)

(58) Field of Classification Search
CPC .................................................. H04W 4/90
(Continued)

(56) References Cited

U.S. PATENT DOCUMENTS 9,432,828 B1 *  8/2016  Tu ..................... H04L 67/12
2004/0125764 A1 *  7/2004  Piwowarski ........... H04W 4/90
                                                                370/328
(Continued)

FOREIGN PATENT DOCUMENTS

EP      1 143 400 A1    10/2001
JP      2006-254285 A    9/2006
(Continued)

OTHER PUBLICATIONS

Written Opinion issued in PCT/JP2017/012895; dated Jun. 13, 2017.
(Continued)

*Primary Examiner* — Michael T Vu
(74) *Attorney, Agent, or Firm* — Studebaker & Brackett PC

(57) ABSTRACT

An emergency notification device (10) for notifying of emergency information, comprising: a voice input/output part (13a, 13b; 48a, 48b) for performing input/output of voice in the vehicle; a wireless communication part (15) for performing wireless communication; a control part (11) controlling the wireless communication part and the voice input/output part to perform voice conversation by wireless communication in case of vehicle emergency; and a vehicle communication part (17) for performing communication with a communication terminal (40) in the vehicle; wherein the control part is configured to, in a voice input/output disabled state, communicate with the communication terminal via the vehicle communication part to perform input/output of voice via the communication terminal in the vehicle and perform voice conversation by wireless communication with the emergency notification center via the wireless communication part.

8 Claims, 3 Drawing Sheets

(58) Field of Classification Search
USPC .......................................... 455/404.1–414.1
See application file for complete search history.

(56) References Cited

U.S. PATENT DOCUMENTS

| | | | | |
|---|---|---|---|---|
| 2011/0281545 A1* | 11/2011 | Murakami | ........... | G08B 25/016 |
| | | | | 455/404.1 |
| 2012/0253821 A1 | 10/2012 | Kamiya | | |
| 2016/0073324 A1* | 3/2016 | Guba | .................... | H04W 4/027 |
| | | | | 455/39 |

FOREIGN PATENT DOCUMENTS

| | | |
|---|---|---|
| JP | 2008-046709 A | 2/2008 |
| JP | 2012-203799 A | 10/2012 |
| JP | 2015-168379 A | 9/2015 |

OTHER PUBLICATIONS

International Search Report issued in PCT/JP2017/012895; dated Jun. 13, 2017.
An Office Action; "Notification of Reasons for Rejection," mailed by the Japanese Patent Office dated May 7, 2018, which corresponds to Japanese Patent Application No. 2016-113228.
The extended European search report issued by the European Patent Office dated Feb. 5, 2019, which corresponds to European Patent Application No. 17809933.9-1206 and is related to U.S. Appl. No. 16/085,610.

* cited by examiner

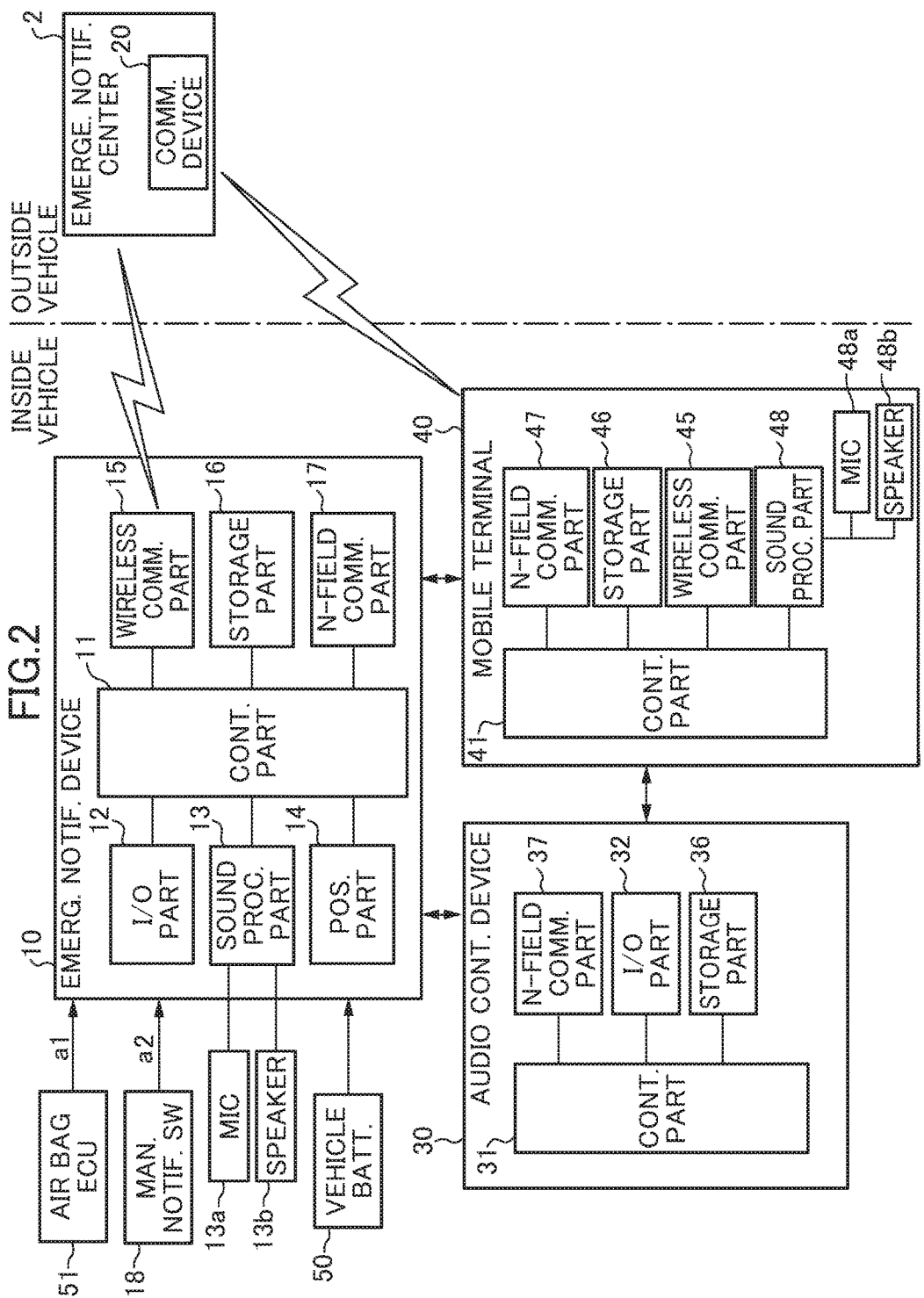

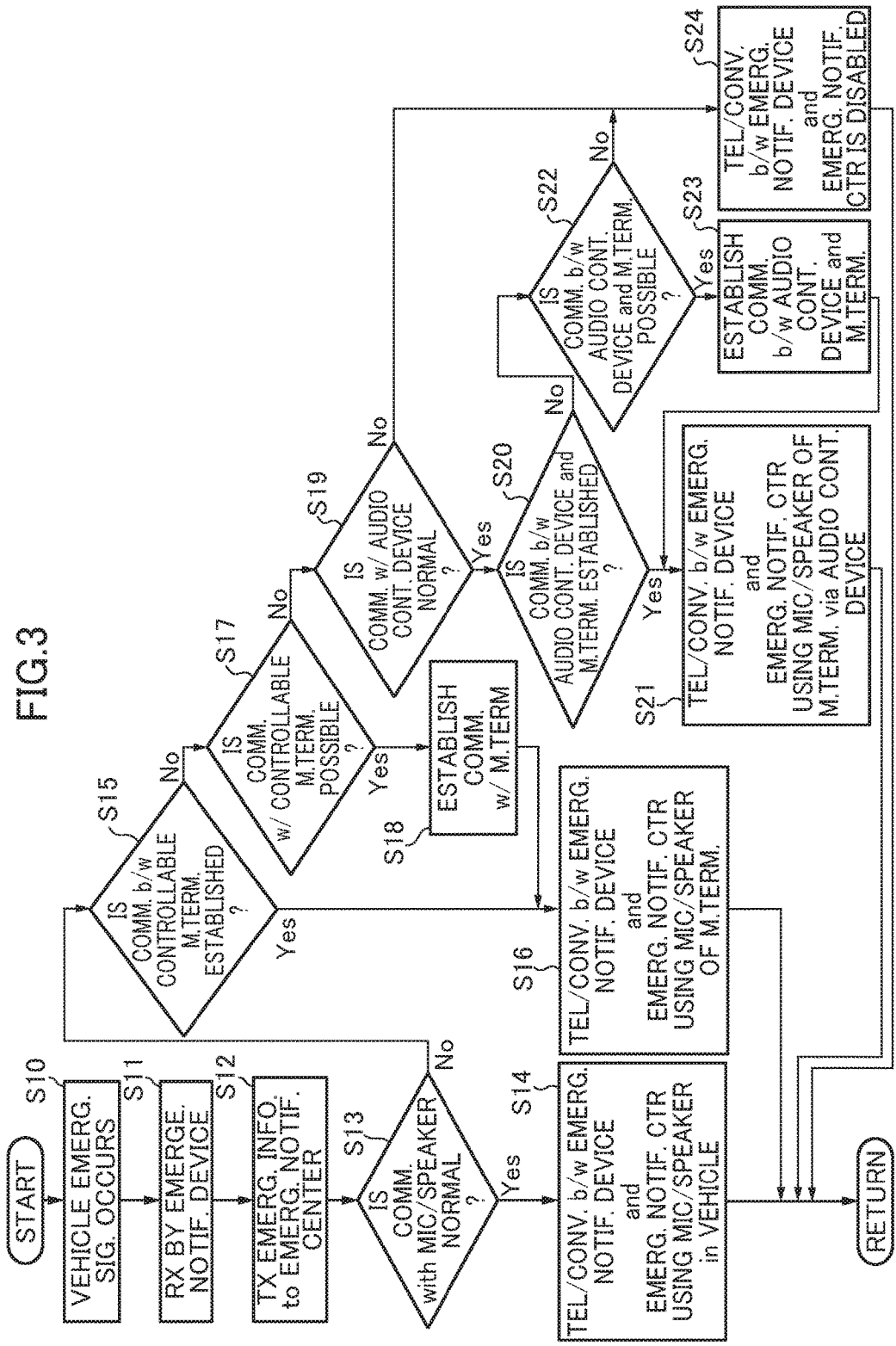

EMERGENCY NOTIFICATION DEVICE

TECHNICAL FIELD

The present invention relates to an emergency notification device, and more particularly to an emergency notification device and an emergency notification system for, in case of vehicle emergency, notifying an emergency notification center outside the vehicle of emergency information from the vehicle.

BACKGROUND ART

Conventionally, emergency notification devices for, in case of emergency such as a vehicle collision and a driver's bad physical condition, notifying a predetermined emergency notification center of emergency information from the vehicle have been known (for example, see Patent Document 1).

In such an emergency notification device, a communication line with the emergency notification center is established in case of emergency to communicate current position information and the like to the emergency notification center, and voice conversation between a driver and an operator of the emergency notification center is enabled using a microphone and a speaker in a vehicle connected to the emergency notification device.

CITATION LIST

Patent Document

Patent Document 1: Japanese Patent Laid-Open No. 2015-168379

SUMMARY OF INVENTION

Technical Problem

However, when breakage or malfunction of the microphone or the speaker in the vehicle occurs due to a vehicle collision or the like, the voice conversation with the emergency notification center is disabled.

The present invention has been made to solve the above problem of the prior-art technique, and an object is to provide an emergency notification device enabling voice conversation with an emergency notification center even if use of a microphone or a speaker in a vehicle is disabled by breakage or malfunction.

Solution to Problem

In order to achieve the above object, an emergency notification device of a first invention of the present invention is an emergency notification device for notifying an emergency notification center outside a vehicle of emergency information from the vehicle in case of vehicle emergency, the emergency notification device comprising: a voice input/output part for performing input/output of voice in the vehicle; a wireless communication part for performing wireless communication with the emergency notification center; a control part controlling the wireless communication part and the voice input/output part to perform voice conversation by wireless communication with the emergency notification center in case of vehicle emergency; and a vehicle communication part for performing communication with a communication terminal in the vehicle; wherein the control part is configured to, in a voice input/output disabled state in which the voice input/output part is not operable to perform input/output of voice in case of vehicle emergency, communicate with the communication terminal via the vehicle communication part to perform input/output of voice by the communication terminal in the vehicle and perform voice conversation by wireless communication with the emergency notification center via the wireless communication part.

In the present invention configured as described above, when it is not possible to perform input/output of voice by the voice input/output part in case of vehicle emergency, the control part performs input/output of voice by the communication terminal via the vehicle communication part and performs voice conversation by wireless communication with the emergency notification center via the wireless communication part. Therefore, even if use of a microphone and a speaker in the vehicle is disabled by breakage or malfunction, it is possible to perform input/output of voice using a microphone and a speaker of the communication terminal, which is a smartphone or the like, via the vehicle communication part, and, thereby, it is possible to perform voice conversation by wireless communication with the emergency notification center via the wireless communication part.

Further, in the present invention, preferably, if communication between the vehicle communication part and the communication terminal is not established in the voice input/output disabled state, the control part is configured to control the vehicle communication part to establish communication with the communication terminal controllable by the control part.

In the present invention configured as described above, even if use of the microphone and the speaker in the vehicle is disabled by breakage or malfunction, if the communication terminal, which is a smartphone or the like, controllable by the control part exists in the vehicle, it is possible to perform input/output of voice using the microphone and the speaker of the communication terminal, which is a smartphone or the like, via the vehicle communication part, and, thereby, it is possible to certainly perform voice conversation by wireless communication with the emergency notification center via the wireless communication part.

Further, an emergency notification device of a second invention of the present invention is an emergency notification device mounted on a vehicle comprising a terminal control unit communicating with a communication terminal in the vehicle and being capable of controlling the communication terminal, the emergency notification device being for notifying an emergency notification center outside the vehicle of emergency information from the vehicle in case of vehicle emergency, and the emergency notification device comprising: a voice input/output part for performing input/output of voice in the vehicle; a wireless communication part for performing wireless communication with the emergency notification center; and a control part controlling the wireless communication part and the voice input/output part to perform voice conversation by wireless communication with the emergency notification center in case of vehicle emergency; wherein the control part is configured to, in a voice input/output disabled state in which the voice input/output part is not operable to perform input/output of voice in case of vehicle emergency, communicate with the communication terminal via the terminal communication unit to perform input/output of voice via the communication terminal in the vehicle and perform voice conversation by wireless communication with the emergency notification center via the wireless communication part.

In the present invention configured as described above, when it is not possible to perform input/output of voice by the voice input/output part in case of vehicle emergency, the control part performs input/output of voice by the communication terminal via the terminal control unit and performs voice conversation by wireless communication with the emergency notification center via the wireless communication part. Therefore, even if use of the microphone and the speaker in the vehicle is disabled by breakage or malfunction, it is possible to perform input/output of voice using the microphone and the speaker of the communication terminal, which is a smartphone or the like, via the terminal control unit, and, thereby, it is possible to perform voice conversation by wireless communication with the emergency notification center via the wireless communication part.

Further, in the present invention, preferably, if communication between the terminal control unit and the communication terminal is not established in the voice input/output disabled state, the control part is configured to control the terminal control unit to establish communication with the communication terminal controllable by the control part.

In the present invention configured as described above, even if use of the microphone and the speaker in the vehicle is disabled by breakage or malfunction, it is possible to perform input/output of voice using the microphone and the speaker of the communication terminal, which is a smartphone or the like, via the terminal control unit if the communication terminal, which is a smartphone or the like, that is connectable to the terminal control unit exists in the vehicle, and, thereby, it is possible to certainly perform voice conversation by wireless communication with the emergency notification center via the wireless communication part.

Further, in the present invention, preferably, the emergency notification device comprises a vehicle communication part for performing communication with the communication terminal in the vehicle; and, if communication between the vehicle communication part and the communication terminal is established in the voice input/output disabled state, the control part is configured to communicate with the communication terminal via the vehicle communication part to perform input/output of voice via the communication terminal in the vehicle and perform voice conversation by wireless communication with the emergency notification center via the wireless communication part; and, if communication between the vehicle communication part and the communication terminal is not established in the voice input/output disabled state, the control part is configured to establish communication with the communication terminal controllable by the control part and, if the control part is not able to establish communication with the communication terminal controllable by the control part, communicate with the communication terminal via the terminal control unit.

In the present invention configured as described above, even if use of the microphone and the speaker in the vehicle is disabled by breakage or malfunction, it is possible to perform input/output of voice using the microphone and the speaker of the communication terminal if the communication terminal controllable by the control part or the communication terminal connectable to the terminal control unit exists in the vehicle, and, thereby, it is possible to more certainly perform voice conversation by wireless communication with the emergency notification center via the wireless communication part.

Advantageous Effect of Invention

According to the emergency notification device of the present invention, it is possible to perform voice conversation with an emergency notification center even if use of a microphone or a speaker in a vehicle is disabled by breakage or malfunction.

BRIEF DESCRIPTION OF DRAWINGS

FIG. 2 is an explanatory diagram showing a configuration of an emergency notification device of the embodiment of the present invention.

FIG. 3 is a flowchart of a process in case of vehicle emergency in the emergency notification system of the embodiment of the present invention.

DESCRIPTION OF EMBODIMENTS

Figure 1:
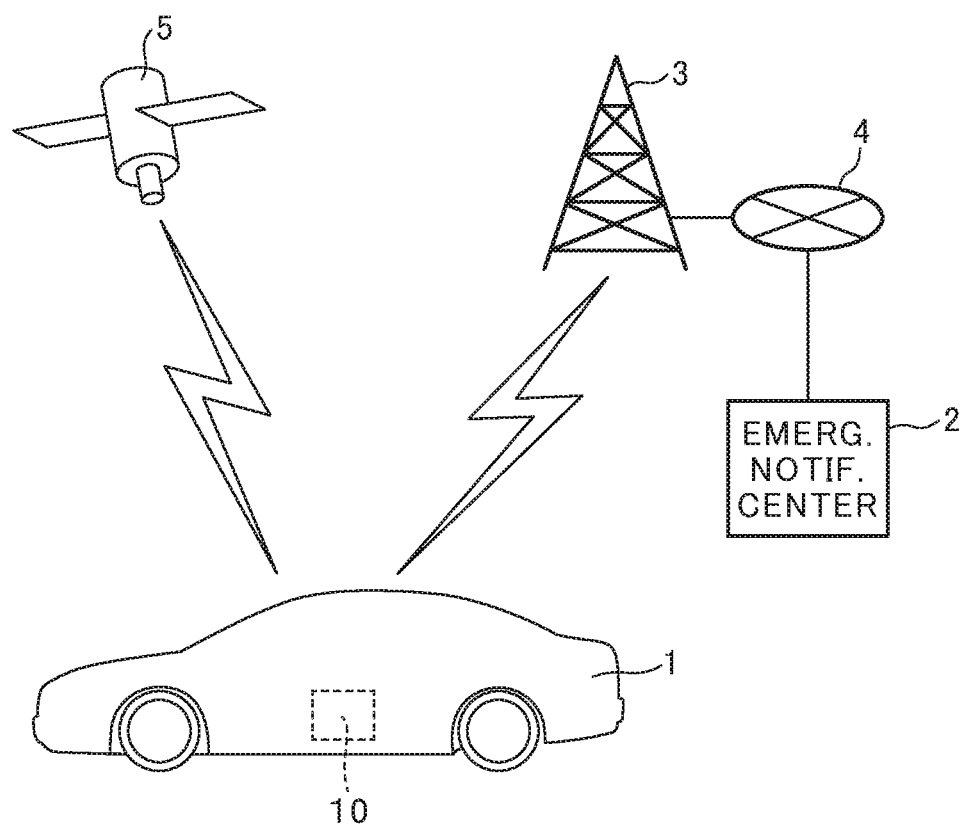
FIG. 1 is an explanatory diagram of an emergency notification system of an embodiment of the present invention.

An emergency notification device according to an embodiment of the present invention will be described below with reference to accompanying drawings.

First, an outline of an emergency notification system of the embodiment of the present invention will be described with reference to FIGS. 1 and 2. FIG. 1 is an explanatory diagram of the emergency notification system, and FIG. 2 is an explanatory diagram showing a configuration of the emergency notification device.

As shown in FIG. 1, a vehicle 1 provided with an emergency notification device 10 is configured such that a communication line can be established with an emergency notification center 2 via a base station 3 and a communication network 4 in case of vehicle emergency (for example, a vehicle collision, sudden illness of a driver, or the like). The vehicle 1 acquires current position information about the vehicle 1 using a GPS satellite 5 and communicates the current position information, vehicle identification information and the like via an established communication line.

Though the vehicle identification information is a serial number for identifying each vehicle 1, the vehicle identification information may be a communication address of the emergency notification device 10 or the like if the vehicle 1 can be identified. Further, voice conversation between the driver and an operator of the emergency notification center 2 is enabled. Thereby, it is possible to quickly perform necessary actions such as arrangement of an ambulance via the emergency notification center 2.

As shown in FIG. 2, the emergency notification device 10 is provided with a control part 11, an I/O part 12, a sound processing part 13, a positioning part 14, a wireless communication part 15, a storage part 16, a near-field communication part 17 and a manual notification switch 18.

The control part 11 is configured with a CPU, for example, and executes an emergency notification process described below in response to receiving a vehicle emergency signal a1 or a2 (that is, in case of vehicle emergency).

The I/O part 12 is a communication interface for performing in-vehicle communication with other units (a control device and the like) of the vehicle 1 via an in-vehicle LAN.

The sound processing part 13 is connected to a microphone 13a and a speaker 13b arranged in the vehicle 1, and is configured to perform conversion processing between a voice signal and an electrical signal when the driver makes a telephone conversation with an operator of the emergency notification center 2.

The positioning part 14 receives a GPS signal from the GPS satellite 5 and acquires the current position information.

The wireless communication part 15 performs wireless communication (data communication and voice communication) with the emergency notification center 2 via the base station 3 and the communication network 4.

The storage part 16 stores vehicle information for identifying the vehicle 1 (the vehicle identification information, a communication address of the emergency notification device 10 and the like) and device information about the emergency notification center 2 (device identification information, a communication destination name, a communication address (a telephone number, an e-mail address and the like) and the like).

The near-field communication part 17 performs, via a communication link established with the other communication devices of the vehicle 1 (hereinafter referred to as a "vehicle communication link"), communication with the other communication devices by near-field wireless communication and wired communication. The near-field wireless communication is communication using, for example, Bluetooth (registered trademark) or wireless LAN (such as Wi-Fi (registered trademark)). The wired communication is communication via a cable, for example.

The manual notification switch 18 is configured such that, when it becomes necessary to make a notification to the emergency notification center 2 because of the driver's sudden illness or the like, the vehicle emergency signal a2 can be outputted to the control part 11 by the driver operating the manual notification switch 18.

The emergency notification device 10 is connected to a vehicle battery 50 and is configured so that power is supplied by the vehicle battery 50. The I/O part 12 and the near-field communication part 17 correspond to a vehicle communication part for performing communication with the communication devices in the vehicle 1.

An air bag ECU 51 is provided with a vehicle collision detection sensor that detects a collision of the vehicle 1 using an acceleration sensor and the like not shown and is configured to, when detecting a vehicle collision, develop an air bag in a predetermined manner. At this time, the air bag ECU 51 transmits a collision detection signal, which is the vehicle emergency signal a1, via the in-vehicle LAN. The emergency notification device 10 can read the collision detection signal on the in-vehicle LAN as the vehicle emergency signal a1.

Though the vehicle emergency signal is generated in response to detection of a vehicle collision in the present embodiment, this is not limitative. The vehicle emergency signal may be generated in response to detection of a particular vehicle failure, detection of the driver's bad physical condition by a monitor camera or the like.

An audio control device 30 is communicably connected to the emergency notification device 10 via the in-vehicle LAN. The audio control device 30 outputs a voice signal of a TV, a radio, a musical medium, a navigation system or the like to a speaker drive unit (not shown). The speaker drive unit causes voice to be outputted from an onboard speaker (not shown) by amplifying a received voice signal and driving the onboard speaker.

As shown in FIG. 2, the audio control device 30 is provided with a control part 31, an I/O part 32, a storage part 36 and a near-field communication part 37. The control part 31 acquires a voice signal from outside and causes the speaker drive unit to operate as described above. Further, the control part 31 executes a process to be described later when the emergency notification device 10 executes the emergency notification process.

The I/O part 32 is a communication interface for performing in-vehicle communication with the other units (the control device and the like) including the emergency notification device 10 via the in-vehicle LAN.

The storage part 36 stores various pieces of voice-related information and the like.

The near-field communication part 37 performs communication with other communication devices by the near-field wireless communication and the wired communication described above.

As shown in FIG. 2, a mobile terminal 40 is, for example, the driver's mobile phone or smartphone and is brought in the vehicle 1. The mobile terminal 40 is provided with a control part 41, a wireless communication part 45, a storage part 46, a near-field communication part 47 and a sound processing part 48.

The control part 41 performs a communication process as a mobile phone and an internal application execution process and the like.

The wireless communication part 45 performs wireless communication (data communication and voice communication) with other communication devices (for example, mobile terminals of family members, and the like) via the base station 3 and the communication network 4.

The storage part 46 stores various applications and music information.

The near-field communication part 47 performs communication with the emergency notification device 10 and the audio control device 30, which are communication devices, via the near-field wireless communication and the wired communication described above.

The sound processing part 48 is connected to a microphone 48a and a speaker 48b of the mobile terminal 40 and is configured to perform conversion processing between a voice signal and an electrical signal when a user uses the mobile terminal 40 to reproduce music or perform voice conversation.

Next, a process performed by the emergency notification device will be described with FIG. 3.

FIG. 3 is a flowchart of a process in case of vehicle emergency in the emergency notification system of the embodiment of the present invention.

The process of FIG. 3 is activated when an ignition of the vehicle 1 is turned on, and the emergency notification device 10 is powered on, and the process is repeatedly executed.

After the process is started, when the vehicle emergency signal a1 (a collision detection signal) is outputted from the air bag ECU 51, or the vehicle emergency signal a2 is outputted from the manual notification switch 18 at step S10, the emergency notification device 10 receives the vehicle emergency signal a1 or a2 at step S11. Various processes for vehicle emergency are executed in response to reception of the signal.

When receiving the vehicle emergency signal a1 or a2, the control part 11 of the emergency notification device 10 controls the wireless communication part 15 to establish a wireless communication link with the communication device 20 of the emergency notification center 2 and transmits emergency information to the emergency notification center 2 at step 12 using the communication address of the emergency notification center 2 stored in the storage part 16. This emergency information includes information about the vehicle emergency (identifying one of a vehicle collision and an operation of the manual notification switch 18), current position information, the vehicle identification information and the like. Furthermore, the emergency information may include other vehicle information (such as the communication address of the emergency notification device 10 and the like).

Next, at step S13, the control part 11 of the emergency notification device 10 judges whether communication is normally possible between the sound processing part 13 of the emergency notification device 10, and the microphone 13*a* and the speaker 13*b* arranged in the vehicle 1. Specifically, the control part 11 judges that communication is normally possible if resistance values of the microphone 13*a* and the speaker 13*b* are within a predetermined range or if current values when desired voltage is applied to the microphone 13*a* and the speaker 13*b* in response to control of the sound processing part 13 are within a predetermined range.

As a result, if communication is normally possible between the sound processing part 13 of the emergency notification device 10, and the microphone 13*a* and the speaker 13*b* arranged in the vehicle 1, the flow proceeds to step S14, and the emergency notification device 10 and the emergency notification center 2 are enabled to perform voice conversation through a wireless communication link established at step S12.

Specifically, when receiving the emergency information, the emergency notification center 2 identifies the vehicle 1 based on the vehicle identification information included in the emergency information and a communication source address accompanying the emergency information, performs a process of displaying the vehicle information and the like about the vehicle 1 on a display device, and performs a voice communication (voice conversation) process via the wireless communication link with the emergency notification device 10 of the vehicle 1. Thereby, the driver of the vehicle 1 is enabled to use the microphone 13*a* and the speaker 13*b* in the vehicle 1 to perform voice conversation by wireless communication with an operator of the emergency notification center 2 via the wireless communication part 15 of the emergency notification device 10.

On the other hand, if breakage or malfunction of the microphone and/or speaker in the vehicle 1 occurs due to a vehicle collision or the like, and it is not possible to perform normal communication between the sound processing part 13 of the emergency notification device 10, and the microphone 13*a* and the speaker 13*b* arranged in the vehicle 1 or perform input/output of voice by the microphone 13*a* and the speaker 13*b* (a voice input/output disabled state), the flow proceeds to step S15, and the control part 11 judges whether or not a vehicle communication link is established with the mobile terminal 40 controllable by the control part 11 at that point of time. Specifically, the control part 11 judges whether or not a communication link is established with the mobile terminal 40 in which an application for use of the mobile terminal by the emergency notification device 10 is installed. Therefore, the control part 11 acquires information about applications installed in the mobile terminal 40 communicating via a vehicle communication link and, if information about the application for use of the mobile terminal by the emergency notification device 10 is included in the acquired information, judges that the communicating mobile terminal 40 is the mobile terminal 40 controllable by the control part 11.

As a result, if a vehicle communication link is established with the mobile terminal 40 controllable by the control part 11, the flow proceeds to step S16, and the control part 11 performs input/output of voice by the controllable mobile terminal 40 and performs voice communication with the emergency notification center 2 through the wireless communication link established at step S12. Thereby, the driver of the vehicle 1 is enabled to use a microphone 48*a* and the speaker 48*b* of the mobile terminal 40 to perform voice conversation by wireless communication with an operator of the emergency notification center 2 via the wireless communication part 15 of the emergency notification device 10.

On the other hand, if a vehicle communication link is not established with the mobile terminal 40 controllable by the control part 11, the flow proceeds to step S17, and the control part 11 judges whether or not a vehicle communication link can be established with the mobile terminal 40 controllable by the control part 11. For example, the control part 11 transmits an inquiry signal to surrounding communication devices based on predetermined communication specifications by the near-field communication part 17 and, if authenticating that a response (including the information about the installed applications) to the inquiry signal is from the mobile terminal 40 controllable by the control part 11, judges that a vehicle communication link can be established.

As a result, if a vehicle communication link can be established with the mobile terminal 40 controllable by the control part 11, the flow proceeds to step S18, and the control part 11 establishes a vehicle communication link with the mobile terminal 40 controllable by the control part 11 and then performs the process of step S16.

On the other hand, if a vehicle communication link cannot be established with the mobile terminal 40 controllable by the control part 11, for example, for reasons such as that a mobile terminal in which the application for use of a mobile terminal by the emergency notification device 10 is installed does not exist in the vehicle 1, the flow proceeds to step S19, and the control part 11 judges whether or not communication between the emergency notification device 10 and the audio control device 30 via the in-vehicle LAN is normal. For example, if the in-vehicle LAN line is not disconnected, and, as a result, some communication data can be received by the I/O part 12 via the in-vehicle LAN, the emergency notification device 10 judges that the in-vehicle LAN communication is normal. Alternatively, a configuration may be made in which, when transmitting a signal for confirming connection to the audio control device 30 via the in-vehicle LAN and then receiving a response to the signal from the audio control device 30, the emergency notification device 10 judges that the in-vehicle LAN communication is normal.

As a result, if communication between the emergency notification device 10 and the audio control device 30 via the in-vehicle LAN is normal, the flow proceeds to step S20, and the control part 11 judges whether or not a vehicle communication link is established between the audio control device 30 and the mobile terminal 40.

If a vehicle communication link is established between the audio control device 30 and the mobile terminal 40, the flow proceeds to step S21, and the control part 11 performs input/output of voice by the mobile terminal 40 connected to the audio control device 30, and communicates with the mobile terminal 40 via the audio control device 30 to perform voice communication with the emergency notification center 2 through the wireless communication link established at step S12. Thereby, the driver of the vehicle 1 is enabled to use the microphone 48*a* and the speaker 48*b* of the mobile terminal 40 to perform voice conversation by wireless communication with an operator of the emergency notification center 2 via the wireless communication part 15 of the emergency notification device 10.

On the other hand, if a vehicle communication link is not established between the audio control device 30 and the mobile terminal 40, the flow proceeds to step S22, and the control part 11 judges whether or not a vehicle communication link can be established between the audio control device 30 and the mobile terminal 40. For example, the control part 11 inquires of the audio control device 30 about device information about communication terminals with which a vehicle communication link can be established and, if authenticating that the mobile terminal 40 is a mobile terminal with which a vehicle communication link can be established and authenticating that a microphone and a speaker of the mobile terminal can be controlled by the audio control device 30, based on the device information acquired from the audio control device 30, judges that a vehicle communication link can be established.

As a result, if a vehicle communication link can be established between the audio control device 30 and the mobile terminal 40, the flow proceeds to step S23, and the control part 11 causes a vehicle communication link to be established between the audio control device 30 and the mobile terminal 40 and then performs the process of step S21.

If communication via the in-vehicle LAN between the emergency notification device 10 and the audio control device 30 is not normal at step S19, or if the audio control device 30 cannot establish a vehicle communication link with the mobile terminal 40, for example, for the reason that the mobile terminal 40 does not exist in the vehicle 1 at step S22, the flow proceeds to step S24, and it is disabled to perform voice conversation by wireless communication with an operator of the emergency notification center 2, via the wireless communication part 15 of the emergency notification device 10.

After step S14, S16, S21 or S24, the emergency notification device 10 ends the process.

Next, a further modification of the embodiment of the present invention will be described.

In the embodiment described above, it has been described that, in a voice input/output disabled state in which it is not possible to perform input/output of voice by the microphone 13a and the speaker 13b in the vehicle 1, the control part 11 communicates with the mobile terminal 40 controllable by the control part 11 via the near-field communication part 17 if a vehicle communication link is established or can be established with the mobile terminal 40 controllable by the control part 11; and, if a vehicle communication link cannot be established with the mobile terminal 40 controllable by the control part 11, the control part 11 communicates with the mobile terminal 40 via the audio control device 30. Then, the control part 11 performs input/output of voice by the mobile terminal 40 in the vehicle 1 and performs voice conversation by wireless communication with the emergency notification center 2 via the wireless communication part 15. However, any one of communication with the mobile terminal 40 controllable by the control part 11 via the near-field communication part 17 and communication with the mobile terminal 40 via the audio control device 30 may be performed.

Next, description will be made on effects of the emergency notification device according to the embodiment of the present invention and the modification of the embodiment of the present invention described above.

First, when it is not possible to perform input/output of voice by the microphone 13a and the speaker 13b in the vehicle 1 in case of emergency of the vehicle 1, the control part 11 performs input/output of voice by the mobile terminal 40 via the near-field communication part 17, and performs voice conversation by wireless communication with the emergency notification center 2 via the wireless communication part 15. Therefore, even if use of the microphone 13a and the speaker 13b in the vehicle 1 is disabled by breakage or malfunction, it is possible to perform input/output of voice using the microphone 48a and the speaker 48b of the mobile terminal 40, which is a smartphone or the like, via the near-field communication part 17. Thereby, it is possible to perform voice conversation by wireless communication with the emergency notification center 2 via the wireless communication part 15.

Especially, when communication between the near-field communication part 17 and the mobile terminal 40 is not established, the control part 11 controls the near-field communication part 17 to establish communication with the mobile terminal 40 controllable by the control part 11. Therefore, even if use of the microphone 13a and the speaker 13b in the vehicle 1 is disabled by breakage or malfunction, it is possible to perform input/output of voice using the microphone 48a and the speaker 48b of the mobile terminal 40, which is a smartphone or the like, via the near-field communication part 17, if the mobile terminal 40, which is a smartphone or the like, controllable by the control part 11 exists in the vehicle 1, and, thereby, it is possible to certainly perform voice conversation by wireless communication with the emergency notification center 2 via the wireless communication part 15.

Further, when it is not possible to perform input/output of voice by the microphone 13a and the speaker 13b in the vehicle 1 in case of emergency of the vehicle 1, the control part 11 performs input/output of voice by the mobile terminal 40 via the audio control device 30, and performs voice conversation by wireless communication with the emergency notification center 2 via the wireless communication part 15. Therefore, even if use of the microphone 13a and the speaker 13b in the vehicle 1 is disabled by breakage or malfunction, it is possible to perform input/output of voice using the microphone 48a and the speaker 48b of the mobile terminal 40, which is a smartphone or the like, via the audio control device 30. Thereby, it is possible to perform voice conversation by wireless communication with the emergency notification center 2 via the wireless communication part 15.

Especially, when communication between the audio control device 30 and the mobile terminal 40 is not established, the control part 11 controls the audio control device 30 to establish communication with the mobile terminal 40 communicable with the audio control device 30. Therefore, even if use of the microphone 13a and the speaker 13b in the vehicle 1 is disabled by breakage or malfunction, it is possible to perform input/output of voice using the microphone 48a and the speaker 48b of the mobile terminal 40, which is a smartphone or the like, via the audio control device 30, if the mobile terminal 40, which is a smartphone or the like, that can connect to the audio control device 30 exists in the vehicle 1, and, thereby, it is possible to certainly perform voice conversation by wireless communication with the emergency notification center 2 via the wireless communication part 15.

Further, when it is not possible to perform input/output of voice by the microphone 13a and the speaker 13b in the vehicle 1, the control part 11 performs input/output of voice by the mobile terminal 40 in the vehicle 1 if communication between the near-field communication part 17 and the mobile terminal 40 is established; performs input/output of voice by the mobile terminal 40 by establishing communication with the mobile terminal 40 controllable by the control part 11 if communication between the near-field communication part 17 and the mobile terminal 40 is not established; and performs input/output of voice by the mobile terminal 40 by communicating with the mobile terminal 40 via the audio control device 30 if communication with the mobile terminal 40 controllable by the control part 11 cannot be established. Therefore, even if use of the microphone 13a and the speaker 13b in the vehicle 1 is disabled by breakage or malfunction, it is possible to perform input/output of voice using the microphone 48a and the speaker 48b of the mobile terminal 40 if the mobile terminal 40 controllable by the control part 11 or the mobile terminal 40 connectable to the audio control device 30 exists in the vehicle 1, and, thereby, it is possible to more certainly perform voice conversation by wireless communication with the emergency notification center 2 via the wireless communication part 15.

REFERENCE SIGNS LIST

1 . . . vehicle
2 . . . emergency notification center
3 . . . base station
4 . . . communication network
5 . . . GPS satellite
10 . . . emergency notification device
11 . . . control part
15 . . . wireless communication part
17 . . . near-field communication part (vehicle communication part)
13a, 48a . . . microphone (voice input/output part)
13b, 48b . . . speaker (voice input/output part)
20 . . . communication device
30 . . . audio control device (terminal control unit)
40 . . . mobile terminal (communication terminal)
a1, a2 . . . vehicle emergency signal

The invention claimed is:

1. An emergency notification device for notifying an emergency notification center outside a vehicle of emergency information from the vehicle in case of vehicle emergency, the emergency notification device comprising:
a voice input/output part for performing input/output of voice in the vehicle;
a wireless communication part for performing wireless communication with the emergency notification center;
a control part controlling the wireless communication part and the voice input/output part to perform voice conversation by wireless communication with the emergency notification center in case of vehicle emergency; and
a vehicle communication part for performing communication with a communication terminal in the vehicle; wherein
the control part is configured to, in a voice input/output disabled state in which the voice input/output part is not operable to perform input/output of voice in case of vehicle emergency, communicate with the communication terminal via the vehicle communication part to perform input/output of voice via the communication terminal in the vehicle and perform voice conversation by wireless communication with the emergency notification center via the wireless communication part.

2. The emergency notification device according to claim 1, wherein, if communication between the vehicle communication part and the communication terminal is not established in the voice input/output disabled state, the control part is configured to control the vehicle communication part to establish communication with the communication terminal controllable by the control part.

3. The emergency notification device according to claim 2, wherein, if communication between the vehicle communication part and the communication terminal is not established in the voice input/output disabled state, the control part is configured to: acquire installed applications information from the communication terminal in the vehicle; and, if information about an application for use of the communication terminal by the emergency notification device is included in the acquired installed applications information, control the vehicle communication part to establish communication with the communication terminal.

4. An emergency notification device mounted on a vehicle comprising a terminal control unit communicating with a communication terminal in the vehicle and being capable of controlling the communication terminal, the emergency notification device being for notifying an emergency notification center outside the vehicle of emergency information from the vehicle in case of vehicle emergency, and the emergency notification device comprising:
a voice input/output part for performing input/output of voice in the vehicle;
a wireless communication part for performing wireless communication with the emergency notification center; and
a control part controlling the wireless communication part and the voice input/output part to perform voice conversation by wireless communication with the emergency notification center in case of vehicle emergency; wherein
the control part is configured to, in a voice input/output disabled state in which the voice input/output part is not operable to perform input/output of voice in case of vehicle emergency, communicate with the communication terminal via the terminal communication unit to perform input/output of voice via the communication terminal in the vehicle and perform voice conversation by wireless communication with the emergency notification center via the wireless communication part.

5. The emergency notification device according to claim 4, wherein, if communication between the terminal control unit and the communication terminal is not established in the voice input/output disabled state, the control part is configured to control the terminal control unit to establish communication with the communication terminal communicable with the terminal control unit.

6. The emergency notification device according to claim 5, wherein, if communication between the terminal control unit and the communication terminal is not established in the voice input/output disabled state, the control part is configured to:
inquire of the terminal control unit about device information about a communication terminal communicable with the terminal control unit;
authenticate that the communication terminal is a communication terminal with which the control part can establish communication, based on the device information acquired from the terminal control unit; and
control the terminal control unit to establish communication with the communication terminal, if voice input/output of the communication terminal is controllable by the terminal control unit.

7. The emergency notification device according to claim 4, further comprising a vehicle communication part for performing communication with the communication terminal in the vehicle; wherein
- if communication between the vehicle communication part and the communication terminal is established in the voice input/output disabled state, the control part is configured to communicate with the communication terminal via the vehicle communication part to perform input/output of voice via the communication terminal in the vehicle and perform voice conversation by wireless communication with the emergency notification center via the wireless communication part; and
- if communication between the vehicle communication part and the communication terminal is not established in the voice input/output disabled state, the control part is configured to: establish communication with the communication terminal controllable by the control part; and, if the control part is not able to establish communication with the communication terminal controllable by the control part, communicate with the communication terminal via the terminal control unit.

8. The emergency notification device according to claim 4, wherein the terminal control unit is an audio control device capable of controlling a drive unit of an onboard speaker.

* * * * *